United States Patent
Ryu et al.

(10) Patent No.: US 9,542,021 B2
(45) Date of Patent: Jan. 10, 2017

(54) TOUCH SCREEN SENSOR SUBSTRATE, TOUCH SCREEN SENSOR, AND PANEL COMPRISING SAME

(71) Applicant: MIRAENANOTECH CO., LTD., Cheongju (KR)

(72) Inventors: Sung Jin Ryu, Cheongju (KR); Hyung Bae Choi, Mungyeong (KR); Ki Won Park, Anyang (KR); Ung Sang Lee, Cheongju (KR); Kyung Hyun Jang, Cheongju (KR)

(73) Assignee: MIRAENANOTECH CO., LTD., Cheongju (KR)

( * ) Notice: Subject to any disclaimer, the term of this patent is extended or adjusted under 35 U.S.C. 154(b) by 0 days.

(21) Appl. No.: 15/217,590

(22) Filed: Jul. 22, 2016

(65) Prior Publication Data

US 2016/0328041 A1   Nov. 10, 2016

Related U.S. Application Data

(63) Continuation of application No. 14/124,813, filed as application No. PCT/KR2012/004576 on Jun. 8, 2012.

(30) Foreign Application Priority Data

Jun. 10, 2011   (KR) .................. 10-2011-0056147
Jun. 17, 2011   (KR) .................. 10-2011-0058859
Mar. 22, 2012   (KR) .................. 10-2012-0029461

(51) Int. Cl.
*G06F 1/16* (2006.01)
*G06F 3/041* (2006.01)

(52) U.S. Cl.
CPC .................. *G06F 3/041* (2013.01)

(58) Field of Classification Search
CPC ........ G06F 3/044; G06F 3/041; G06F 3/0412; G06F 2203/04112; G06F 3/0418; G06F 3/0414

See application file for complete search history.

(56) References Cited

U.S. PATENT DOCUMENTS

2008/0303798 A1*  12/2008  Matsudate ............ G06F 3/0412
                                                              345/173
2008/0309633 A1   12/2008  Hotelling et al.
(Continued)

FOREIGN PATENT DOCUMENTS

CN    101520708 A    2/2009
CN    201732353 U    2/2011
(Continued)

OTHER PUBLICATIONS

International Search Report for PCT/KR2012/004576 filed on Jun. 8, 2012.
(Continued)

*Primary Examiner* — Dwayne Bost
*Assistant Examiner* — Robert Michaud

(57) ABSTRACT

The present invention relates to a touch screen sensor substrate, to a touch screen sensor, and to a touch screen panel comprising same. The touch screen sensor substrate according to the present invention comprises: a plurality of sensing units formed of electrodes connected into a pattern of a predetermined direction at one surface of a base; and a connection unit which is formed of electrodes connected into a pattern of a direction which is the same as or similar to the direction of the pattern of the sensing units, and which connects the sensing units.

28 Claims, 8 Drawing Sheets

(56) References Cited

U.S. PATENT DOCUMENTS

| | | | |
|---|---|---|---|
| 2009/0219257 A1 | 9/2009 | Frey et al. | |
| 2010/0007621 A1* | 1/2010 | Kang | G06F 3/044 345/173 |
| 2010/0085322 A1* | 4/2010 | Mamba | G06F 3/044 345/173 |
| 2010/0182249 A1* | 7/2010 | Kang | G06F 3/044 345/173 |
| 2010/0302204 A1 | 12/2010 | Miyayama et al. | |
| 2011/0102361 A1 | 5/2011 | Philipp | |
| 2011/0102370 A1* | 5/2011 | Kono | G06F 3/044 345/174 |
| 2012/0031746 A1* | 2/2012 | Hwang | G06F 3/041 200/5 A |

FOREIGN PATENT DOCUMENTS

| | | |
|---|---|---|
| EP | 2 544 080 A2 | 1/2013 |
| JP | 2004-086626 A | 3/2004 |
| JP | 2006-344163 A | 12/2006 |
| JP | 2008-254331 A | 10/2008 |
| JP | 2009-009249 A | 1/2009 |
| JP | 2010-092152 A | 4/2010 |
| JP | 2010-262529 A | 11/2010 |
| JP | 2010-286886 A | 12/2010 |
| JP | 2011-059771 A | 3/2011 |
| JP | 2011-070536 A | 4/2011 |
| JP | 2011-513846 A | 4/2011 |
| JP | 2011-113149 A | 6/2011 |
| KR | 10-2004-0022243 A | 3/2004 |
| KR | 10-2008-0096976 A | 11/2008 |
| KR | 10-2009-0058070 A | 6/2009 |
| KR | 10-2010-0006987 A | 1/2010 |
| KR | 10-2010-0095886 A | 9/2010 |
| KR | 10-2011-0054369 A | 5/2011 |
| TW | 200609859 A | 3/2006 |
| WO | WO 2011/062301 A1 | 5/2011 |
| WO | WO 2011/065032 A1 | 6/2011 |

OTHER PUBLICATIONS

Extended Search Report for European Patent Application No. 12 796 334.6 dated Feb. 2, 2015.

Supplementary European Search Report for European Patent Application No. 12 79 6334 dated Jan. 23, 2015.

* cited by examiner

TOUCH SCREEN SENSOR SUBSTRATE, TOUCH SCREEN SENSOR, AND PANEL COMPRISING SAME

CROSS-REFERENCE TO RELATED APPLICATIONS

The present specification is a continuation of U.S. patent application Ser. No. 14/124,813 filed Dec. 9, 2013, which is a National Stage of International Patent Application No. PCT/KR2012/004576 filed Jun. 8, 2012, which claims priority to and the benefit of Korean Patent Application Nos. 10-2011-0056147, 10-2011-0058859, and 10-2012-0029461 filed in the Korean Intellectual Property Office on Jun. 10, 2011, Jun. 17, 2011 and Mar. 22, 2012, respectively, the entire contents of which are incorporated herein by reference.

TECHNICAL FIELD

The present invention relates to a substrate for a touch screen sensor, a touch screen sensor, and a touch screen panel including the same. More particularly, the present invention relates to a substrate for a touch screen sensor for reducing visibility of a sensing pattern provided in order to sense a touch signal of a user in a touch screen sensor, a touch screen sensor, and a manufacturing method thereof.

BACKGROUND ART

A touch screen panel, as an input and output means for sensing a touch position of a user on a display screen and receiving information on the sensed touch position to perform an overall control of an electronic device including a display screen control, is a device which recognizes a touch as an input signal when an object such as a finger or a touch pen is touched on a screen. The touch input device has been mainly mounted on a mobile device such as a mobile phone, personal digital assistants (PDA), and a portable multimedia player (PMP) in recent years. The touch input device is being used throughout overall industries such as a navigation, a netbook, a notebook, a digital information device (DID), a desktop computer using an operating system that supports touch input, an internet protocol TV (IPTV), a state-of-the-art fighter, a tank, and an armored vehicle.

However, since the touch panel is added on a display device such as a liquid crystal display (LCD), a plasma display panel (PDP), an organic light emitting diode (OLED), and an active matrix organic light emitting diode (AMOLED) or embedded in the display device, there is a problem in visibility for a user.

DETAILED DESCRIPTION OF THE INVENTION

Technical Problem

In order to solve the problem in visibility, in a touch screen sensor including an ITO transparent electrode in the related art, sensing and operating sensors are formed by patterning a transparent electrode material (ITO), and since recognition for a changed value of capacitance is deteriorated due to high specific resistance of the ITO material as a distance between the sensing and operating sensors is increased and a distance between a touching finger and the sensor is increased, there is a limit to use a high-transparent and high-durable base. The touch screen panel in the related art has a problem in that a pattern is recognized, in the case where an electrode layer is formed of a material other than ITO and thus a dimensional difference of the operating and sensing patterns exists due to opacity of the electric layer.

Technical Solution

The present invention has been made in an effort to provide a substrate for a touch screen sensor capable of reducing visibility of an electrode pattern by using a sensing unit and a dummy unit formed of electrodes of conductive materials without using a transparent electrode material (ITO).

A pattern of the connecting units connecting the plurality of sensing units forms the same pattern as the pattern of the sensing units to reduce visibility, and an edge of the sensing unit or the connecting unit is not connected by an edge electrode and is opened, and as a result, electrodes which are actually separated from each other with minute intervals are viewed to be continuous by the user.

A black metallic seed layer is formed above the electrode layer formed with electrodes, such that the electrode layer is not exposed.

An exemplary embodiment of the present invention provides a substrate for a touch screen sensor, including: a plurality of sensing units formed by electrodes which are connected to each other in a pattern having a predetermined direction on one side of a base; and sensing connecting units formed by electrodes which are connected to each other in a pattern having the same or a similar direction as or to the direction of the pattern and connecting the sensing units.

The substrate for a touch screen sensor may further include a plurality of dummy units which are adjacent to the sensing units and formed by electrodes which are connected to each other in a pattern having the same or a similar direction as or to the direction of the pattern to reduce visibility of the sensing units.

The substrate for a touch screen sensor may further include dummy connecting units formed by electrodes which are connected to each other in a pattern having the same or a similar direction as or to the direction of the pattern and connecting the dummy units.

The pattern having the predetermined direction may be formed in a continuous pattern, and a part of the pattern may be disconnected on a boundary between the sensing unit and the dummy unit.

The part of the pattern which is disconnected may mean that an edge of the pattern is formed to be opened on a boundary between the sensing unit and the dummy unit.

The edge which is formed to be opened may mean that the pattern is alternately formed to be long and short at the edge.

The pattern may be a lattice-shaped pattern in which lines formed in the predetermined direction cross each other.

The lattice-shaped lines crossing each other in the pattern may have the same or similar line width and pitch defining an interval between the lines or have a line width or pitch having predetermined similarity.

The line widths or the pitches of the lattice-shaped lines may be determined according to a fill factor defining an area of the lines occupied in the substrate.

The fill factor of the lines may be formed to be 10% or less on the substrate.

The lattice-shaped lines crossing each other may be tilted according to a predetermined angle.

The predetermined angle may be an angle determined in order to prevent a moire phenomenon from being generated due to a mutual interference between the pattern having the predetermined direction and a different pattern from the pattern.

The dummy unit may be formed to be insulated from the sensing unit.

The substrate for a touch screen sensor may further include a resin layer laminated on the base and including a patterned intaglio on one side; and an electrode layer formed by filling a conductive material in the intaglio, in which the sensing unit, the dummy unit, and the sensing and dummy connecting units may be formed on the electrode layer.

The filled conductive material may include copper (Cu), silver (Ag), aluminum (Al), nickel (Ni), chromium (Cr), and nickel-phosphorous (Ni—P).

The substrate for a touch screen sensor may further include a black layer configured to reduce visibility of the sensing unit, the dummy unit, and the sensing and dummy connecting units which are formed on the electrode layer, in which the black layer may be laminated above the electrode layer of the intaglio.

Another exemplary embodiment of the present invention provides a touch screen sensor, including: a first sensor including a plurality of first sensing units formed by electrodes which are connected to each other in a first pattern having a first direction on one side of a base and first sensing connecting units formed by electrodes which are connected to each other in a pattern having the same or a similar direction as or to the first direction and connecting the first sensing units; and a second sensor including a plurality of second sensing units formed by electrodes which are connected to each other in a second pattern having a second direction on the other side of the base or one side of another base and second sensing connecting units formed by electrodes which are connected to each other in a pattern having the same or a similar direction as or to the second direction and connecting the second sensing units.

The first sensor may include a plurality of first dummy units which are adjacent to the first sensing units and formed by electrodes which are connected to each other in a pattern having the same or a similar direction as or to the first direction to reduce visibility of the sensing units, and the first dummy unit may be formed at a position of one side of the base corresponding to a position of the second sensing unit.

The first sensor may include first dummy connecting units formed by electrodes which are connected to each other in a pattern having the same or a similar direction as or to the direction of the first pattern and connecting the first dummy units.

The second sensor may include a plurality of second dummy units which are adjacent to the second sensing units and formed by electrodes which are connected to each other in a pattern having the same or a similar direction as or to the second direction to reduce visibility of the sensing units, and the second dummy unit may be formed at a position of the other side of the base corresponding to a position of the first sensing unit.

The second sensor may include second dummy connecting units formed by electrodes which are connected to each other in a pattern having the same or a similar direction as or to the direction of the second pattern and connecting the second dummy units.

The first or second pattern having the predetermined direction may be formed in a continuous pattern, and a part of the pattern may be disconnected on a boundary between the sensing unit and the dummy unit.

The part of the first or second pattern which is disconnected may mean that an edge of the first or second pattern is formed to be opened on a boundary between the sensing unit and the dummy unit.

The edge which is formed to be opened may mean that the first or second pattern is alternately formed to be long and short at the edge.

The first or second pattern may be a lattice-shaped pattern in which lines formed in the predetermined direction cross each other.

The lattice-shaped lines crossing each other in the first or second pattern may have the same or similar line width and pitch defining an interval between the lines or have a line width or pitch having predetermined similarity. The line widths or the pitches of the lattice-shaped lines may be determined according to a fill factor defining an area of the lines occupied in the substrate.

The fill factor of the lines may be formed to be 10% or less on the substrate.

The lattice-shaped lines crossing each other may be tilted according to a predetermined angle.

The predetermined angle may be an angle determined in order to prevent a moire phenomenon from being generated due to a mutual interference between the first pattern and the second pattern.

The first or second dummy unit may be formed to be insulated from the first or second sensing unit.

The first or second sensor may include a resin layer laminated on the base and including a patterned intaglio on one side; and an electrode layer formed by filling a conductive material in the intaglio, and the sensing unit, the dummy unit, and the connecting units may be formed on the electrode layer.

The filled conductive material may include copper (Cu), silver (Ag), aluminum (Al), nickel (Ni), chromium (Cr), and nickel-phosphorous (Ni—P).

The first or second sensor may further include a black layer configured to reduce visibility of the sensing unit, the dummy unit, and the connecting units which are formed on the electrode layer, and the black layer may be laminated above the electrode layer of the intaglio.

Yet another exemplary embodiment of the present invention provides a touch screen panel, including: an image information display unit configured to display image information by using a plurality of pixels; a first sensor including a plurality of first sensing units formed by electrodes which are connected to each other in a first pattern having a first predetermined direction on one side of a base which is positioned on the upper surface of the image information display unit and first sensing connecting units formed by electrodes which are connected to each other in a pattern having the same or a similar direction as or to the first direction and connecting the first sensing units; and a second sensor including a plurality of second sensing units formed by electrodes which are connected to each other in a second pattern having a second predetermined direction on the other side of the base or one side of another base and second sensing connecting units formed by electrodes which are connected to each other in a pattern having the same or a similar direction as or to the second direction and connecting the second sensing units.

The first sensor may include a plurality of first dummy units which are adjacent to the first sensing units and formed by electrodes which are connected to each other in a pattern having the same or a similar direction as or to the first direction to reduce visibility of the sensing units, and the first dummy unit may be formed at a position of one side of the base corresponding to a position of the second sensing unit.

The first sensor may include first dummy connecting units formed by electrodes which are connected to each other in a pattern having the same or a similar direction as or to the direction of the first pattern and connecting the first dummy units.

The second sensor may include a plurality of second dummy units which are adjacent to the second sensing units and formed by electrodes which are connected to each other in a pattern having the same or a similar direction as or to the second direction to reduce visibility of the sensing units, and the second dummy unit may be formed at a position of the other side of the base corresponding to a position of the first sensing unit.

The second sensor may include second dummy connecting units formed by electrodes which are connected to each other in a pattern having the same or a similar direction as or to the direction of the second pattern and connecting the second dummy units.

The first or second pattern having the predetermined direction may be formed in a continuous pattern, and a part of the pattern may be disconnected on a boundary between the sensing unit and the dummy unit.

The part of the first or second pattern which is disconnected may mean that an edge of the first or second pattern is formed to be opened on a boundary between the sensing unit and the dummy unit.

The edge which is formed to be opened may mean that the first or second pattern is alternately formed to be long and short at the edge.

The first or second pattern may be a lattice-shaped pattern in which lines formed in the predetermined direction cross each other.

The lattice-shaped lines crossing each other in the first or second pattern may have the same or similar line width and pitch defining an interval between the lines or have a line width or pitch having predetermined similarity. The line widths or the pitches of the lattice-shaped lines may be determined according to a fill factor defining an area of the lines occupied in the substrate.

The fill factor of the lines may be formed to be 10% or less on the substrate.

The lattice-shaped lines crossing each other may be tilted according to a predetermined angle.

The predetermined angle may be an angle determined in order to prevent a moire phenomenon from being generated due to a mutual interference between the first pattern and the second pattern.

The first or second dummy unit may be formed to be insulated from the first or second sensing unit. The first or second sensor may include a resin layer laminated on the base and including a patterned intaglio on one side; and an electrode layer formed by filling a conductive material in the intaglio, and the sensing unit, the dummy unit, and the connecting units may be formed on the electrode layer.

The filled conductive material may include copper (Cu), silver (Ag), aluminum (Al), nickel (Ni), chromium (Cr), and nickel-phosphorous (Ni—P).

The first or second sensor may further include a black layer configured to reduce visibility of the sensing unit, the dummy unit, and the connecting units which are formed on the electrode layer, and the black layer may be laminated above the electrode layer of the intaglio.

Advantageous Effects

According to the exemplary embodiments of the present invention, in order to prevent the sensing unit of the substrate for a touch screen sensor from being recognized by a user, a pattern of the connecting units connecting the plurality of sensing units forms the same pattern as the sensing units, and an edge of the sensing unit or the connecting unit is not connected by an edge electrode and is opened, and as a result, electrodes which are actually separated from each other with minute intervals are viewed to be continuous by the user, thereby reducing visibility of the sensing unit. A black metallic seed layer is formed above the electrode layer formed with electrodes, such that the electrode layer is not exposed.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1A:
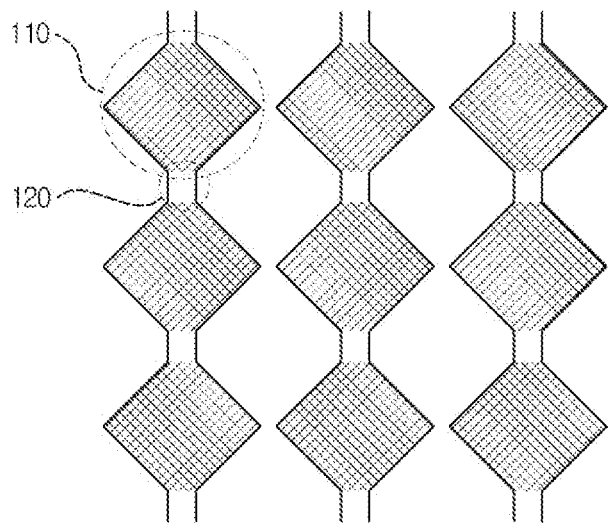
FIGS. 1A and 1B are exemplified diagrams illustrating a sensing unit and a connecting unit in a touch panel in the related art to be solved in the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

MODE FOR THE INVENTION

Hereinafter, exemplary embodiments of the present invention will be described in detail with reference to the accompanying drawings. In this description, when any component is connected to another component, any component may be directly connected to another component and may also be connected to another component with a third component interposed therebetween. First, in adding reference numerals to components throughout the drawings, it is to be noted that like or similar reference numerals designate like or similar components even though the components are illustrated in different drawings. In this case, configuration and operation of the present invention which are illustrated in the drawings and described as those illustrated in the drawings are described as at least one exemplary embodiment, and the spirit and main configurations and operations of the present invention are not limited thereto.

Before describing exemplary embodiments of the present invention, several terms used in this specification will be described. First, the term "substrate" is used for manufacturing a touch screen sensor, and may also be called a "film" in this specification. A touch screen sensor may be manufactured by singly forming the substrate or forming two sheets of substrates as an upper substrate and a lower substrate to adhere to each other. In this specification, it should be noted that a so called first sensor may be any one of the upper substrate and the lower substrate, a so called second sensor may be any one of the lower substrate and the upper substrate, and the first and second sensors are called in order to be used without distinguishing the upper and lower sides.

Hereinafter, an exemplary embodiment of the present invention will be described.

Figure 1B:
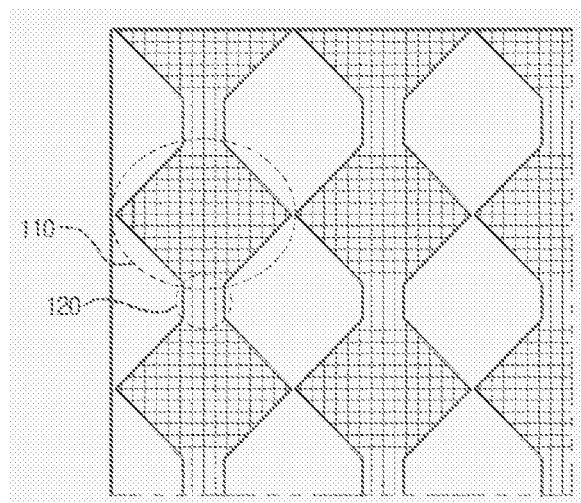

FIGS. 1A and 1B are exemplified diagrams illustrating a sensing unit 110 and a connecting unit 120 in a substrate for a touch screen sensor in the related art to be solved in the present invention. Referring to FIGS. 1A and 1B, the sensing unit 110 in the related art is formed as electrodes connected to each other in a pattern of a predetermined direction on one side of a base, but since the connecting unit 120 is formed as electrodes connected to each other in a different pattern from the sensing unit 110, there is a problem in that visibility of the sensing unit 110 and the connecting unit 120 is increased due to a difference between the patterns as continuity of the electrodes disappears. Edges of the sensing unit 110 or the connecting unit 120 are connected to each other by edge electrodes, such that continuity of the electrodes disappears, thereby increasing the visibility of the sensing unit 110 or the connecting unit 120 in the related art.

Accordingly, in order to solve the increase in the visibility of the sensing unit 110 in the related art, the present invention provides a substrate for a touch screen sensor having the same or similar patterns of the sensing unit 110 and the connecting unit 120 connecting the sensing unit 110.

Figure 2A:
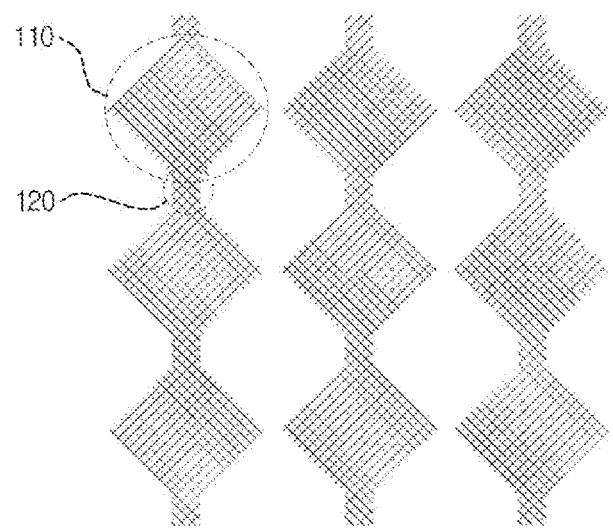
FIG. 2A is an exemplified diagram illustrating a sensing unit and a connecting unit of a substrate for a touch screen sensor according to an exemplary embodiment of the present invention.

FIG. 2A is an exemplified diagram illustrating a sensing unit and a connecting unit of a substrate for a touch screen sensor according to an exemplary embodiment of the present invention. Referring to FIG. 2A, a substrate for a touch screen sensor according to the exemplary embodiment includes a plurality of sensing units 110 formed by electrodes connected to each other in a pattern having a predetermined direction on one side of a base and connecting units 120 formed by electrodes connected to each other in a pattern having the same or a similar direction as or to the pattern, and connecting the sensing units 110.

Figure 2B:
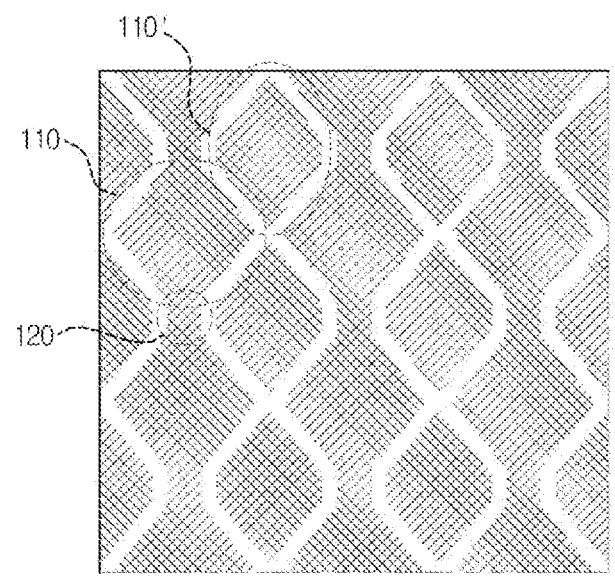
FIG. 2B is an exemplified diagram illustrating a sensing unit, a connecting unit and a dummy unit of a substrate for a touch screen sensor according to the exemplary embodiment of the present invention.

Referring to FIG. 2B, the substrate for a touch screen sensor according to the exemplary embodiment may further include a plurality of dummy units 110' which are adjacent to the sensing units 110 and formed by electrodes connected to each other in a pattern having the same or a similar direction as or to the patterns to reduce visibility of the sensing units 110 and connecting units (not shown) which are formed by electrodes connected to each other in a pattern having the same or a similar direction as or to the pattern and connecting the dummy units 110'.

Here, the sensing unit 110, as an electrode provided in order to sense a touch signal of a user, is made of a conductive material in the present invention, and the conductive material may be opaque.

The dummy unit 110' is an electrode by neighboring with or being adjacent to the sensing unit 110, and means an electrode formed in an inactive state or a combination thereof which is formed in a dummy, that is, a pattern having a similar shape to the sensing unit 110 so as not to sense the touch signal of the user. Accordingly, the sensing unit 110 and the dummy unit 110' are formed to be electrically insulated from each other. The reason why the dummy unit 110' is formed on the base is that the sensing unit 110 which is not made of a transparent electrode material is formed on the front side of the touch screen sensor to prevent the sensing unit 110 from being recognized by external light irradiated to the touch screen sensor.

In FIG. 2, the sensing unit 110 and the dummy unit 110' are formed in a linear shape, but the present invention is not limited thereto and may be formed in various pattern shapes. For example, the overall shape of the sensing unit 110 may have a diamond, a trapezoid, a rhombus, and the like.

Meanwhile, the electrode is an electrode provided in order to transmit the touch signal sensed from the sensing unit 110 to an external driving circuit (not shown) and may be simultaneously formed when the sensing unit 110 and the dummy unit 110' are formed. In the present invention, since the details for the electrode is beyond the scope of the present invention, the more detailed description thereof is omitted.

In the case of including the sensing unit 110, the dummy unit 110', and a sensing connecting unit 120 connecting the sensing units 110 or a dummy connecting unit in the substrate for the touch screen sensor according to the exemplary embodiment, the dummy connecting unit (not shown) connecting the dummy units 110' may be formed by electrodes connected to each other in the same or a similar pattern having a predetermined direction. In the exemplary embodiment, the pattern having a predetermined direction is a continuous pattern, and as illustrated in FIG. 2, may be a lattice-shaped pattern where lines formed in the predetermined direction cross each other.

In the exemplary embodiment, the same or similar pattern may include patterns of which repeated cycles and repeated shapes are geometrically the same and the repeated cycles and repeated shapes are formed in an acceptable error range which is predetermined by software. Accordingly, in the exemplary embodiment, in the case of including the electrode patterns of the sensing unit 110 and the dummy unit 110' and the sensing connecting unit 120 and the dummy connecting unit which connect the sensing units 110 and the dummy units 110', the electrode pattern of the dummy connecting unit (not shown) is the same, thereby reducing visibility of the sensing unit 110 recognized by the user.

The pattern having the predetermined direction is formed in a continuous pattern, and a part of the pattern may be disconnected on a boundary of the dummy unit 110'. The disconnection of the part of the pattern may be formed when an edge of the pattern of the dummy connecting unit (not shown) is opened, in the case where the sensing unit 110, the dummy unit 110', the sensing connecting unit 120, and the dummy connecting unit are included.

Figure 3:
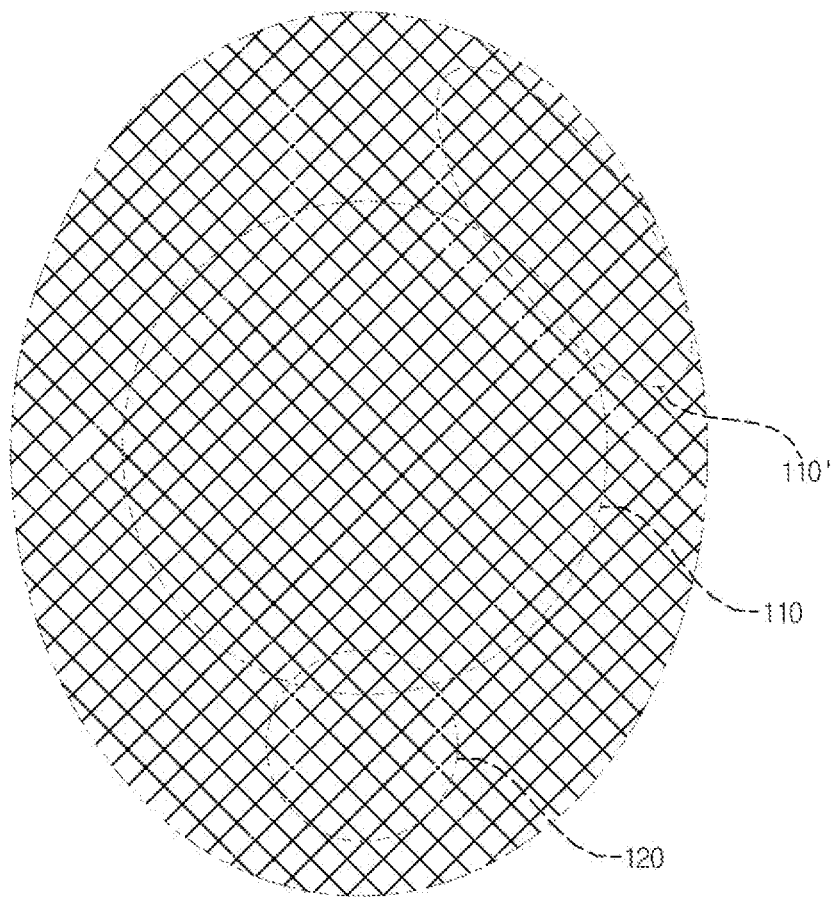
FIG. 3 is an exemplified diagram illustrating a sensing unit, a connecting unit and a dummy unit of a substrate for a touch screen sensor according to the exemplary embodiment of the present invention.

As described above, the disconnection of the part of the pattern on the boundary of the sensing unit 110 and the dummy unit 110' means that the sensing unit 110 and the dummy unit 110' are electrically insulated from each other, and the opened edges of the patterns of the sensing unit 110 and the dummy unit 110' formed by the disconnection means that the edges are not connected to edge electrodes as illustrated in FIG. 3. FIG. 3 is an enlarged view of a part of FIG. 2B, and referring to FIG. 3, since the edges are opened, the problem in that the continuity disappears to be disconnected by connecting the edges to the edge electrodes is solved and the edges are separated from each other with a minute interval, but taken as a whole, the electrodes are recognized to be continuous by the user, thereby reducing visibility of the sensing unit 110.

Figure 4:
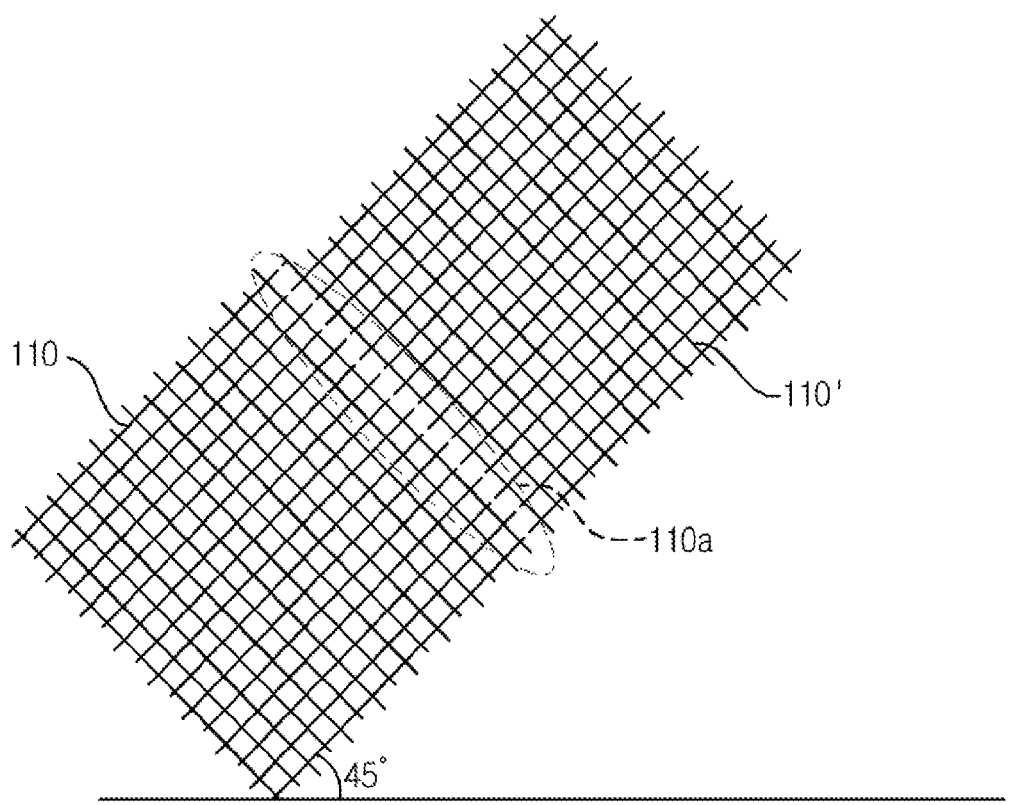
FIG. 4 is an exemplified diagram illustrating a lattice-shaped pattern forming a sensing unit, a connecting unit and a dummy unit of a substrate for a touch screen sensor according to the exemplary embodiment of the present invention.

In the exemplary embodiment, the opened edge means that the patterns are alternately formed to be long and short at the edges, and referring to FIG. 4, the sensing unit 110 or the dummy unit 110' of FIG. 4 may be formed as a plurality of electrodes which are disposed so that lengths of the electrodes become alternately short and long at the edges. In the exemplary embodiment, the alternation means that the short and long lengths are repeated according to an order, and referring to reference numeral 110a of FIG. 4, long and short electrodes are alternately repeated at the edges or regularly or irregularly repeated according to a predetermined pattern in FIG. 4.

In the exemplary embodiment, the pattern may be a lattice-shaped pattern in which lines formed in a predetermined direction cross each other as illustrated in FIG. 2. The lattice-shape in which the lines formed in a predetermined direction cross each other means that a lattice-shaped pattern of a net shape or a mesh shape is entirely formed.

The lines crossing each other of the lattice-shaped pattern may have the same line width and pitch defining an interval between the lines or have a line width and a pitch having predetermined similarity. In the exemplary embodiment, the same line width or pitch or the line width or pitch having predetermined similarity means that the line width and pitch have values in a predetermined range represented by Table 1 so as to acquire predetermined fill factors.

TABLE 1

| Line width (μm) | Pitch (μm) | Fill Factor (%) |
| --- | --- | --- |
| 1~5 | 100 | 1.9~10 |
|  | 200 | 2.5~5.0 |
|  | 300 | 1.9~3.5 |
|  | 400 | 1.4~2.5 |
|  | 500 | 0.4~1.9 |
|  | 600 | 0.3~1.7 |
| 6~10 | 100 | 11~19 |
|  | 200 | 5.9~10 |
|  | 300 | 3.9~7.0 |
|  | 400 | 2.9~5.0 |
|  | 500 | 2.3~3.9 |
|  | 600 | 1.9~3.3 |

Figure 5:
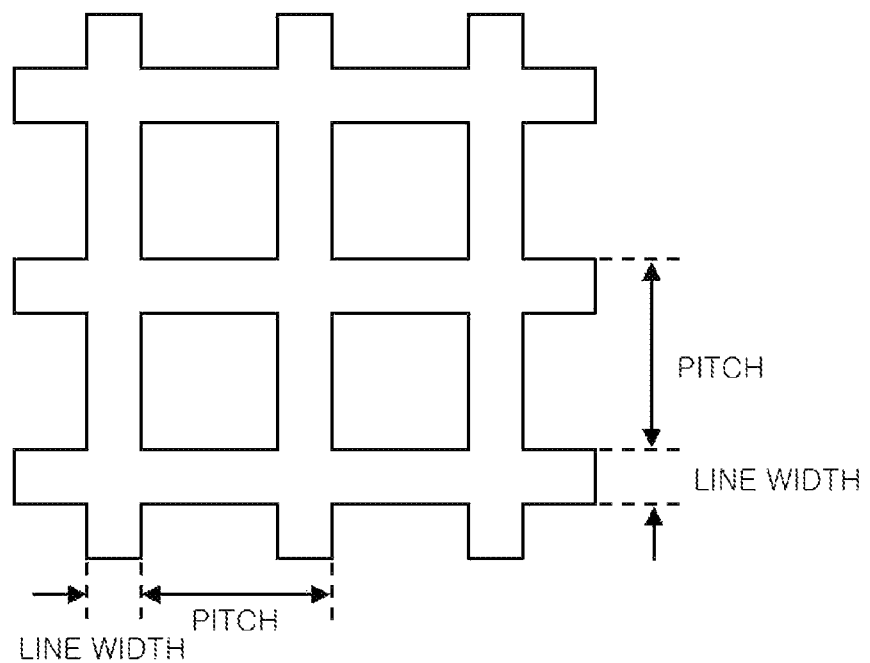
FIG. 5 is an exemplified diagram illustrating a line width and a pitch of an electrode in a substrate for a touch screen sensor according to the exemplary embodiment of the present invention.

Referring to FIG. 5 and Equation 1, the fill factor is defined as a ratio of dividing an area where an electrode layer (means an electrode layer formed by the dummy unit 110' and the sensing unit 110) is occupied by an area of a lattice-shaped pattern (shape of the dummy unit 110' or the sensing unit 110) formed on one substrate or any lattice-shaped substrate represented by laminating a multiple substrate, and is represented by the following Equation 1.

Fill factor (%)=100−[[(horizontal pitch−line width)× (vertical pitch−line width)/(horizontal pitch× vertical pitch)]×100]  [Equation 1]

When the defined fill factor is smaller than 1.4, transmittance increases, but resistance of the electrode layer rises and a contact area of capacitance is reduced, and as a result, a touch operation may not be smoothly performed, and when the fill factor is larger than 10, an area of the electrode layer occupied in the substrate is large, and as a result, transmittance is deteriorated and the pattern is recognized.

Accordingly, the fill factor may have values of preferably 1.4 to 10.0% and more preferably 1.4 to 7.0%. The line width and the pitch may be properly controlled according to a value of the fill factor.

In the exemplary embodiment, the lattice-shaped lines crossing each other may be tilted according to a predetermined angle. Referring to FIG. 4, the lines formed in the exemplary embodiment has a pattern having a shape tilted by 45° based on a horizontal axis, and the tilted shape increases accuracy of the sensing by increasing a ratio of electrodes for sensing a touch input per unit area, and the predetermined tilted angle may be an angle determined in order to prevent a moire phenomenon from occurring due to a mutual interference between a pattern having a predetermined direction and a pattern different from the pattern. In the exemplary embodiment, the interference between the pattern and the different pattern may be an interference caused by electrodes formed on the substrate by laminating a plurality of substrates which sense touch positions of different directions, or may be caused by patterns formed by a plurality of pixels included in an image information display unit displaying image information.

The moire phenomenon means a natural interference phenomenon formed in the case where two independent periodic patterns are laminated at a predetermined angle. The moire pattern means a strength fluctuation of a wave shape, a ripple shape, and a small wisp shape which seems to be laminated with a display image of the screen.

In the exemplary embodiment, preventing the occurrence of the moire phenomenon may mean that a torsion is applied according to a first predetermined angle between directions of patterns so that strength fluctuations of a wave shape, a ripple shape, and a small wisp shape which seems to be laminated with a display image of the screen are not generated by laminating the patterns by preventing the mutual interference of the patterns, or the strength fluctuations formed according to lamination is not recognized by the user. The "not recognized by the user" means that a repeated interval of a third formed pattern is an interval of a resolution or less which defines a interval capable of being discriminated by naked eyes of a person.

In the exemplary embodiment, the tilted angle includes an angle capable of being differently determined according a line width and a pitch in addition to the angle shown in FIG. 4. In the exemplary embodiment, since the pattern having the predetermined direction has a predetermined direction based on the tilted pattern, in the case where the sensing unit 110, the dummy unit 110', the sensing connecting unit 120, and the dummy connecting unit are included, the dummy connecting unit (not shown) may be formed of electrodes connected to each other in a pattern having the same or a similar direction as or to the tilted pattern.

Figure 6A:
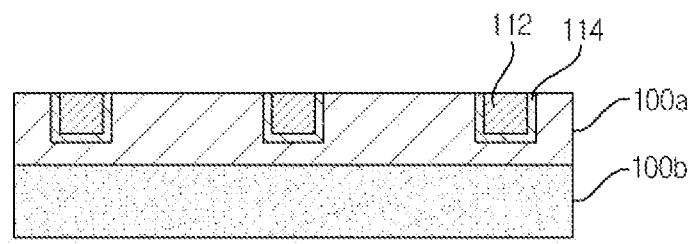
FIG. 6A is a cross-sectional view illustrating a substrate for a touch screen sensor according to an exemplary embodiment of the present invention.
Figure 6B:
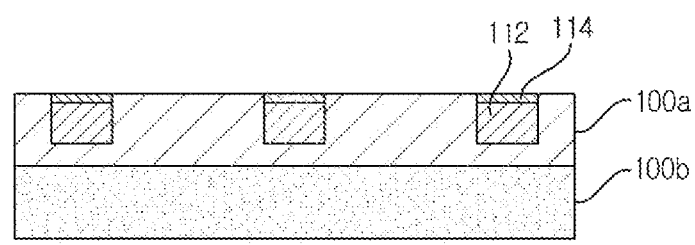
FIG. 6B is a cross-sectional view illustrating a substrate for a touch screen sensor according to an exemplary embodiment of the present invention.

Referring to FIG. 6B, the substrate for a touch screen sensor according to the exemplary embodiment includes a base 100*b*, a resin layer 100*a* and an electrode layer 112.

The base 100*b* may be formed of a transparent base 100*b*. That is, as the base 100*b* having predetermined transparency, the transparent base 100*b* may be formed in a transparent thin film form by using at least one of polyethylene terephthalate (PET), polyimide (PI), acryl, polycarbonate (PC), triacetate cellulose (TAC), polymethyl methacrylate (PMMA), polyethersulfone (PES), polyethylene naphthalate (PEN), or glass.

The resin layer 100*a* is laminated on the base 100*b* and has a patterned intaglio on one surface. In detail, the resin layer 100*a* is laminated on the transparent base 100*b*, and the intaglio shape is formed by imprinting a mold having an embossed shape corresponding to a desired intaglio shape on the resin layer 100*a*. That is, the intaglio is formed on the resin layer 100*a* by using the mold having the embossed shape. Accordingly, one or more intaglio forms any pattern. A cross section of the resin layer 100*a* with the intaglio may have an intaglio shape of any one of a quadrangle, a triangle, and a trapezoid. When the embossed shape of the mold is a quadrangle, the intaglio shape formed on the resin layer 100*a* is a quadrangle, and when the embossed shape of the mold is a triangle, the intaglio shape formed on the resin layer 100*a* is a triangle, and when the embossed shape of the mold is a trapezoid, the intaglio shape formed on the resin layer 100*a* is a trapezoid. A 'width' of the intaglio in the resin layer 100*a* may be in the range of 1 μm to 10 μm, a 'depth' may be in the range of 1 μm to 10 μm, and a 'pitch' between the intaglios may be in the range of 200 μm to 600 μm. Of course, this case just corresponds to an exemplary embodiment, and the width, depth and pitch of the intaglio may be variously modified. The resin layer 100*a* may be implemented by an ultraviolet (UV) resin or a thermosetting resin.

The electrode layer 112 is formed by filling a conductive material in the intaglio, and in the case where the sensing unit 110, the dummy unit 110', the sensing connecting unit 120, and the dummy connecting unit are included, the dummy connecting unit (not shown) is formed on the electrode layer 112. Here, examples of the conductive material may include copper (Cu), silver (Ag), aluminum (Al), nickel (Ni), chromium (Cr), nickel-phosphorous (Ni—P), and the like.

The sensing unit 110 and the dummy unit 110' may be simultaneously formed and made of the same conductive material, but as described above, the sensing unit 110 is an electrode which senses and transmits a touch signal and is electrically active, and the dummy unit 110' is an electrode which is electrically inactive.

The substrate for a touch screen sensor according to the exemplary embodiment may further include a black layer 114 configured to reduce visibility of the dummy connecting unit (not shown) in the case where the sensing unit 110 formed on the electrode layer 112, the dummy unit 110', the sensing connecting unit 120, and the dummy connecting unit are included, and the black layer 114 may be laminated above the electrode layer 112 of the intaglio or between the resin layer 100*a* and the electrode layer 112. Referring to FIG. 6A, in the exemplary embodiment, the black layer 114 is laminated between the resin layer 100*a* and the electrode layer 112 and a black layer 114 covering the electrode layer 112 in the intaglio formed in the resin layer 100*a* is further included, thereby reducing the visibility of the electrode layer 112. According to another exemplary embodiment, referring to FIG. 6B, the black layer 114 is laminated to cover the electrode layer 112 in the intaglio, not cover the electrode layer 112. Accordingly, the sensing substrate according to the exemplary embodiment prevents the electrode layer from being recognized from the outside by using the black layer. In the exemplary embodiment, the black layer may have conductivity including carbon black and may use a black metallic material.

Figure 7A:
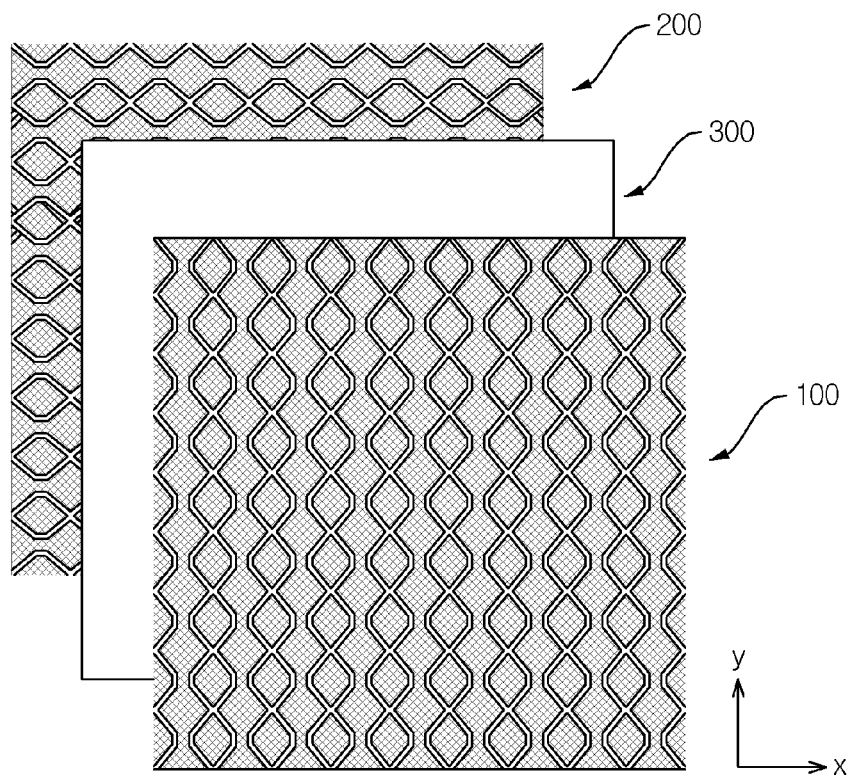
FIGS. 7A and 7B are exemplified diagrams illustrating the configuration of a touch screen sensor and a cross-sectional view of the touch screen sensor according to the exemplary embodiment of the present invention.
Figure 7B:
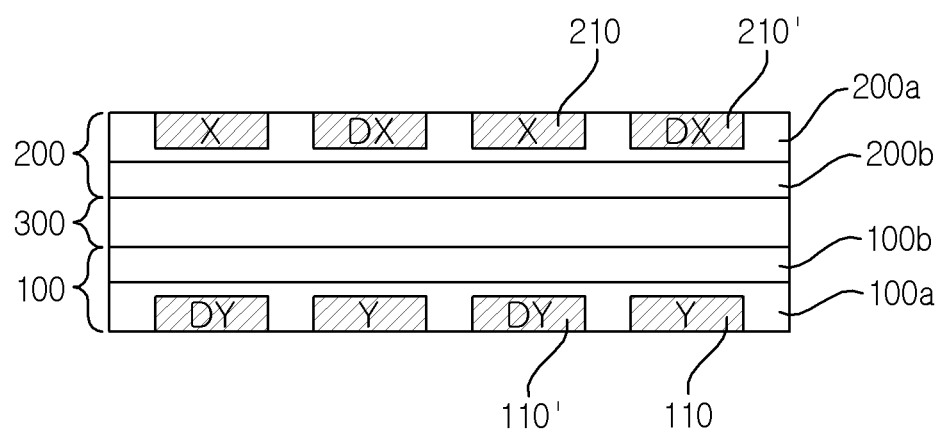

FIGS. 7A and 7B are diagrams for describing a touch screen sensor according to a second exemplary embodiment of the present invention. Referring to FIG. 7A, a first sensor 100 and a second sensor 200 according to the exemplary embodiment adhere to each other to form a touch screen sensor. That is, the first sensor 100 and the second sensor 200 adhere to each other as upper and lower substrates, and an adhesive layer 300 may be interposed therebetween. The adhesive layer 300 may maintain transparency of the touch screen sensor by using an optical clear adhesive (OCA).

In the exemplary embodiment, the first sensor 100 includes a plurality of first sensing units 110 formed by electrodes which are connected to each other in a pattern having a first direction on one side of a base and first sensing connecting units 120 formed by electrodes which are connected to each other in a pattern having the same or a similar direction as or to the first direction and connect the first sensing units 110.

The second sensor 200 includes a plurality of second sensing units 210 formed by electrodes which are connected to each other in a pattern having a second direction on the other side of a base and second sensing connecting units 220 formed by electrodes which are connected to each other in a pattern having the same or a similar direction as or to the second direction and connect the second sensing units 210. Referring to FIG. 7B, in the exemplary embodiment, in the case where the first sensor 100 and the second sensor 200 are formed on both sides of the same base, when a side with the substrate is one side, the other side is the other side of the base on which the substrate is not formed. In the exemplary embodiment, the first and second sensing units 100 and 200 are estranged from each other and adhere to each other by the adhesive layer 300, but the substrates may face each other to adhere to each other. The first sensor and the second sensor may be formed on one side with respect to a plurality of bases, respectively.

Although not illustrated, insulating layers which are laminated on the sensors 100 and 200 may be further included in the first sensor 100 and the second sensor 200. Here, the insulating layer may include polyethylene terephthalate (PET) and a coating having transparency laminated on the PET, and an anti-reflection (AR)-low reflection (LR)-antiglare coating (AG) layer may be further laminated on the insulating layer so as to reduce reflectance of external light in a touch screen panel.

The first sensor 100 of the touch screen sensor according to the exemplary embodiment includes a plurality of first dummy units 110' which are adjacent to the first sensing units 110 and formed by electrodes which are connected to each other in a pattern having the same or a similar direction as or to the first pattern to reduce the visibility of the sensing unit 110, and first sensing connecting units 120 formed by electrodes which are connected to each other in the pattern having the same or a similar direction as or to the first pattern and connecting the first dummy units 110', and the first dummy unit 110' may be included at a position corresponding to the second sensing unit 210 on one side of the base.

The second sensor 200 may further include a plurality of second dummy units 210' which are adjacent to the second sensing units 210 and formed by electrodes connected to each other in a pattern having the same or a similar direction as or to the second patterns to reduce visibility of the sensing units 210 and connecting units (not shown) formed by electrodes which are connected to each other in a pattern having the same or a similar direction as or to the pattern and connecting the dummy units 110'.

The first sensor 100 and the second sensor 200 may be one and the other one of the substrates of the touch screen sensor according the first exemplary embodiment of the present invention, and accordingly, the detailed description thereof which is the same as the description for the substrate for a touch screen sensor described above is omitted.

In the exemplary embodiment, the first sensor 100 and the second sensor 200 may adhere to each other in a direction that the first sensing unit 110 formed in the first sensor 100 and the second sensing unit 210 formed in the second sensor 200 cross each other. That is, if the first direction of the first sensing unit 110 is a y direction on a coordinate axis, the second direction of the second sensing unit 210 adheres to the first direction so as to be an x direction on the coordinate axis.

In this case, the second dummy unit 210' is formed in the second sensor 200 at a position corresponding to (facing) the first sensing unit 110, and the first dummy unit 110' is formed in the first sensor 100 at a position corresponding to (facing) the second sensing unit 210. The first dummy unit 110' may be formed on one side of the base corresponding to the position of the second sensing unit 210, and on the contrary, the second dummy unit 210' may be formed on the other side of the base corresponding to the position of the first sensing unit 110. Referring to FIG. 7B, in the exemplary embodiment, the dummy unit 110' in a Y axial direction is positioned on the other side of the base at a position corresponding to a vertical direction to a position of the sensing unit 210 sensing a touch position in an X axial direction on the touch screen sensor, and on the contrary, the dummy unit 210' in an X axial direction is positioned on one side of the base at a position corresponding to a vertical direction to a position of the sensing unit 110 sensing a touch position in a Y axial direction on the touch screen sensor. Accordingly, the first sensing unit 110 and the second sensing unit 210 are alternately disposed to be formed so as to calculate coordinates thereof when the touch signal of the user is inputted.

In the exemplary embodiment, the first sensor and the second sensor may be formed on one side and the other side of the same base as described above, or may be formed on different bases, respectively.

Even in the case where the first and second sensors are formed on different bases, similarly to the case where the first and second sensors are formed on the same base, the first sensor and the second sensor may adhere to each other in a direction that the first sensing unit formed in the first sensor and the second sensing unit formed in the second sensor are perpendicular to each other. That is, if the first direction of the first sensing unit is a y direction on a coordinate axis, the second direction of the second sensing unit adheres to the first direction so as to become an x direction on the coordinate axis.

In this case, the second dummy unit is formed in the second sensor at the position corresponding to the first sensing unit, and the first dummy unit is formed in the first sensor at the position corresponding to the second sensing unit. The first dummy unit may be formed on one side of the base corresponding to the position of the second sensing unit, and on the contrary, the second dummy unit 210' may be formed on the other side of the base corresponding to the position of the first sensing unit. A touch screen panel according to an exemplary embodiment of the present invention includes an image information display unit and a touch screen sensor.

The image information display unit displays image information by using a plurality of pixels. In the exemplary embodiment, the image information display unit may include image display devices such as a liquid crystal display (LCD), a plasma display panel (PDP), an organic light emitting diode (OLED), and an active matrix organic light emitting diode (AMOLED) which are used in mobile devices such as a mobile phone, personal digital assistants (PDA), and a portable multimedia player (PMP). The image display devices may be included in overall industries in which image output devices such as a navigation, a netbook, a notebook, a digital information device (DID), a desktop computer using an operating system that supports touch input, an internet protocol TV (IPTV), a state-of-the-art fighter, a tank, and an armored vehicle may be used.

The touch screen sensor includes the first sensor and the second sensor. In the exemplary embodiment, the first sensor includes a plurality of first sensing units formed by electrodes connected to each other in a first pattern having a first predetermined direction on one side of the base positioned on the upper surface of the image information display unit and a first sensing connection unit formed by electrodes which are connected to each other in a pattern having the same or a similar direction as or to the first direction and connecting the first sensing units. The second sensor includes a plurality of second sensing units formed by electrodes connected to each other in a second pattern having a second predetermined direction on the other side of the base or one side of another base and second sensing connection units formed by electrodes which are connected to each other in a pattern having the same or a similar direction as or to the second direction and connecting the second sensing units.

Hereinafter, first and second sensors correspond to the first and second sensors 100 and 200 of the substrate for a touch screen sensor or the touch screen sensor described above, and thus the detailed description thereof is duplicated and omitted.

Figure 8:
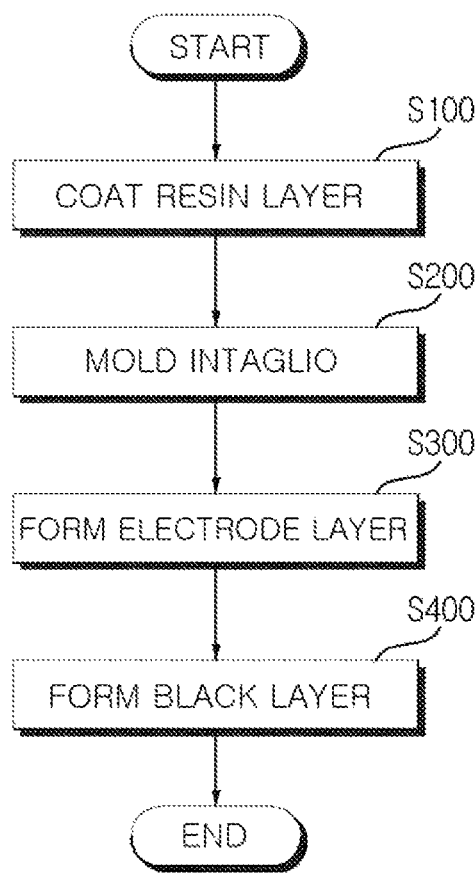
FIG. 8 is a flowchart illustrating a manufacturing method of a substrate for a touch screen sensor according to an exemplary embodiment of the present invention.

Hereinafter, a process of forming an electrode by forming and filling an intaglio in a resin layer according to at least one exemplary embodiment of the present invention will be described. FIG. 8 is a flowchart illustrating a manufacturing method of a substrate for a touch screen sensor according to an exemplary embodiment of the present invention. Referring to FIG. 8, a manufacturing method of a substrate for a touch screen sensor according to the exemplary embodiment includes coating a resin layer (S100), molding an intaglio (S200), forming an electrode layer (S300), and forming a black layer (S400).

In the coating of the resin layer (S100), the resin layer is laminated on the base, and a resin film or glass may be sued as the base. The base may be formed of a transparent base. That is, the base having predetermined transparency may be formed in a transparent thin film form by using at least one of the above materials. A thickness of the base may be in the range of 25 to 250 μm in order to improve luminance, and light transmittance may be 80% or more, and more preferably 90% or more.

In the molding of the intaglio (S200), the resin layer is imprinted by a mold to form a patterned intaglio. In the case of using a UV curing resin or thermosetting resin as the resin layer 100a, after a mold is compressed with a material before curing and the resin layer 100a is cured by applying UV or heat in the compressed state, the mold is removed, thereby forming the intaglio. In this case, a mold having an embossed shape for forming the intaglio in the resin layer 100a may have a haze of 4% or less after patterning the intaglio by using a material having a sufficiently low illuminance, and this is because the luminance deteriorates to have a bad influence on a product performance in the case where the haze is more than 4%. In the exemplary embodiment, since the sensing unit 110, the dummy unit and the connecting unit 120 are formed through the forming of the electrode layer in which a conductive material is filled in the intaglio formed in the molding of the intaglio, in the molding of the intaglio according to the exemplary embodiment, a structure of the electrode of the substrate for the touch screen sensor is formed of the intaglio.

Accordingly, in the molding of the intaglio (S200), the intaglios are molded in order to form the sensing units 110 formed in a pattern having a predetermined direction on one side of the base and the connecting units 120 formed in a pattern having the same or a similar direction as or to the direction of the pattern and connecting the sensing units 110. In the case where dummy units and dummy connecting unit which are adjacent to the sensing units 110 and formed in a pattern having the same or a similar direction as or to the direction of the pattern to reduce visibility of the sensing units 110 are included, the molding of the intaglio further includes molding an intaglio for forming dummy connecting units (not shown).

As described above, in the exemplary embodiment, the pattern having the predetermined direction is formed in a continuous pattern, but a part of the pattern may be disconnected on a boundary of the sensing unit 110 and the dummy unit. That is, in the case where the sensing unit 110, the dummy unit, the sensing connecting unit 120, and the dummy connecting unit are included, edges of the patterns of the dummy connecting unit (not shown) may be opened. The "part of the pattern is disconnected on a boundary of the sensing unit 110 and the dummy unit" means that the sensing unit 110 and the dummy unit are electrically insulated from each other, and the "disconnected" means that the edges of the patterns of the sensing unit 110 and the dummy unit are not connected by edge electrodes.

Since the edges are opened to be connected to the edge electrodes as described above, the problem in that the continuity disappears to be disconnected is solved and actually, the edges are separated from each other with a minute interval, but taken as a whole, the electrodes are recognized to be continuous by the user, thereby reducing visibility of the sensing unit 110. In the exemplary embodiment, the "edges are opened" means that the patterns are alternately formed to be long and short at the edges, and the sensor or the dummy unit may be formed as a plurality of electrodes which are disposed so that lengths of the electrodes become alternately short and long at the edges.

The pattern formed in the molding of the intaglio (S200) according to the exemplary embodiment may be a lattice-shaped pattern in which lines formed in a predetermined direction cross each other, and the lines crossing each other of the lattice-shaped pattern may have the same line width and the same pitch defining an interval between the lines or have a line width or pitch having predetermined similarity. In the exemplary embodiment, the lattice-shaped lines crossing each other may be tilted according to a predetermined angle.

In the forming of the electrode layer (S300), a conductive material is filled in the intaglio formed in the molding of the intaglio (S200), and in the case where the sensing unit 110, the dummy unit 110', and the connecting unit 120 are formed on the electrode layer 112 filled with the conductive material in the forming of the electrode layer (S300). Here, examples of the conductive material may include copper (Cu), silver (Ag), aluminum (Al), nickel (Ni), chromium (Cr), nickel-phosphorous (Ni—P), and the like.

Accordingly, in the exemplary embodiment, the sensing unit 110 and the dummy unit 110' may be simultaneously formed and made of the same material, but as described above, the sensing unit 110 is an electrode which senses and transmits a touch signal and is electrically active, and the dummy unit 110' is an electrode which is electrically inactive.

In the forming of the electrode layer (S300), the electrode layer may be formed by forming a seed layer, and in more detail, a surface treatment layer, on which a surface treatment is performed in order to improve adhesion between a 'seed layer' to be formed on the inner surface of the intaglio and the surface of the resin layer 100a and the 'resin layer 100a', may be formed.

As the surface treatment, chemical etching or catalyst treatment using an alkali aqueous solution, plasma or ion-beam treatment, and the like may be applied.

Thereafter, a metallic seed layer is formed on the surface treatment layer. The seed layer may be formed by an electroless plating, CVD deposition, sputtering or printing method. In this specification, the metallic material means the aforementioned electrode material. Thereafter, the electrode layer is formed on the seed layer by electroless plating, CVD deposition, sputtering, a coating method or a printing method.

In a method of removing the seed layer from the surface of the resin layer except for the intaglio pattern region, the seed layer formed on the surface of the resin layer is selectively removed by filling a resin having an anti-etching property in the intaglio which is the pattern region and then depositing the filled resin in an etchant. In this case, a chemical used for etching includes any one of nitric acid, sulfuric acid series, hydrochloric acid, copper sulfate, ferric chloride, and copper chloride.

In the forming of the electrode layer (S300), an electrode may be formed in the intaglio of the resin layer without the seed layer, and in more detail, the forming of the electrode layer in the intaglio without the seed layer is to remove a remaining material on the surface of the resin layer 100a by a blade after coating a conductive material on the surface of the resin layer 100a and the intaglio. In more detail, the conductive material is coated on the resin layer 100a without a metallic seed layer and the remaining material is wiped and scraped by using a blade so as not to remain on other surfaces, thereby manufacturing a substrate for a touch screen panel.

In the forming of the black layer (S400), a conductive black material is laminated above the electrode layer 112 of the intaglio formed in the forming of the electrode layer (S300). In the exemplary embodiment, in the forming of the black layer (S400), as described in FIG. 6B, the black layer 114 is laminated to reduce visibility of the electrode layer 112.

Hereinafter, a cross-sectional structure of the touch screen panel in the exemplary embodiment will be described.

In the touch screen panel according to the exemplary embodiment, two substrates are laminated on a liquid crystal panel (LCD panel), and each substrate is made of a UV resin, PET, and hardcoating. That is, each substrate may be constituted with a resin layer including an electrode layer, a PET laminated on the resin layer, and a hardcoating having a predetermined hardness or more laminated on the PET, and the substrates may adhere to each other by an adhesive layer (OCA) and may also adhere to each other by interposing the adhesive layer (OCA) between the coating and the resin layer.

The touch screen panel according to the exemplary embodiment may be configured by laminating an AR/LR/AG layer on the uppermost side of the touch screen panel. The touch screen panel according to the exemplary embodiment may be configured by forming the adhesive layer (OCA) on the uppermost side of the touch panel and laminating at least one of glass, acryl, and a transparent base having a predetermined hardness or more.

The touch screen panel according to the exemplary embodiment may be configured by laminating an AR/LR/AG layer on the uppermost side of the touch panel.

In the touch screen panel according to the exemplary embodiment, at least one of glass, acryl, and a transparent base having a predetermined hardness or more is provided on the adhesive layer (OCA) interposed between the liquid crystal panel (LCD panel) and the substrate.

In the touch screen panel according to the exemplary embodiment, at least one of glass, acryl, and a transparent base having a predetermined hardness or more is provided on the adhesive layer (OCA) interposed between the liquid crystal panel (LCD panel) and the substrate.

In the touch screen panel according to the exemplary embodiment, two substrates are laminated on the liquid crystal panel (LCD panel), and a lower substrate is made of a UV resin, PET, and hardcoating. That is, the lower substrate is constituted with a resin layer including an electrode layer, a PET laminated on the resin layer, and a hardcoating having a predetermined hardness or more laminated on the PET.

On the contrary, an upper substrate is configured by laminating at least one of glass, acryl, and a transparent base having a predetermined hardness or more. That is, the upper substrate is constituted with a resin layer including an electrode layer and at least one of glass, acryl, and a transparent base having a predetermined hardness or more laminated on the resin layer, and the upper substrate and the lower substrate may adhere to each other by the adhesive layer (OCA). The substrates may adhere to each other on the coating of the lower substrate and the resin layer of the upper substrate by interposing the adhesive layer.

The touch screen panel according to the exemplary embodiment is configured by laminating an AR/LR/AG layer on the uppermost side of the touch panel.

In the touch screen panel according to the exemplary embodiment, at least one of glass, acryl, and a transparent base having a predetermined hardness or more is laminated on the liquid crystal panel, and a lower substrate where the resin layer including the electrode layer is laminated thereon and an upper substrate where one of glass, acryl, and a transparent base having a predetermined hardness or more is laminated on the resin layer including the electrode layer adhere to each other by the adhesive layer.

In the touch screen panel according to the exemplary embodiment, an AR/LR/AG layer is laminated on the uppermost side of the touch panel. In the touch screen panel according to the exemplary embodiment, the substrate where one of glass, acryl, and a transparent base having a predetermined hardness or more is laminated on the resin layer, the resin layer is laminated thereon, and the coating having a predetermined hardness or more is laminated on the resin layer adheres to the liquid crystal panel by the adhesive layer.

In the touch screen panel according to the exemplary embodiment, the substrate where the resin layer including the electrode layer is laminated, one of glass, acryl, and a transparent base having a predetermined hardness or more is laminated on the resin layer, the resin layer is laminated thereon, and the AR/LR/AG layer is laminated on the resin layer adheres to the liquid crystal panel by the adhesive layer.

In the touch screen panel, a layer selected from any one of glass, acryl, and a transparent base having a predetermined hardness or more is laminated on a boundary, and the resin layer laminated on the upper and lower portions of the selected layer may be laminated so that the electrode layer included in the resin layer does not directly contact the selected layer. The reason is that the resin layer including the electrode layer formed in the intaglio may directly adhere to the layer selected from any one of glass, acryl, and a transparent base having a predetermined hardness or more, such that an amount of the adhesive used may be reduced and as a result, a manufacturing cost may be reduced.

Meanwhile, in the case of the touch screen panel having the structure in which the intaglio of the resin layer is in contact with the LCD panel, when the resin layer is in contact with the LCD panel, the intaglio formed in the resin layer serves as illumination, thereby deteriorating image quality on the display. Therefore, in order to improve the problem, the OCA or the adhesive needs to be filled in the intaglio of the resin layer including the electrode layer.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The invention claimed is:

1. A substrate for a touch screen sensor, comprising:
    a plurality of sensing units, each of the sensing units including electrodes that are connected to each other in a pattern on one side of a base;
    sensing connecting units, each of the sensing connecting units including electrodes that are connected to each other in a pattern that is the same as the pattern of the sensing units, each of the sensing connecting units connecting adjacent sensing units;
    a plurality of dummy units, each of the dummy units being disposed adjacent to corresponding sensing units and including electrodes that are connected to each other in a pattern that is the same as or similar to the pattern of the sensing units; and a black layer configured to reduce visibility of the sensing units, the dummy units, and the sensing connecting units, wherein the pattern of a corresponding one of the sensing units is disconnected on a boundary between the corresponding one of the sensing units and an adjacent dummy unit such that the pattern has an edge that corresponds to the boundary and is opened.

2. The substrate for a touch screen sensor of claim 1, wherein the pattern is alternately formed to be long and short at the edge.

3. The substrate for a touch screen sensor of claim 1, wherein the pattern is a lattice-shaped pattern in which lines formed in predetermined directions cross each other.

4. The substrate for a touch screen sensor of claim 3, wherein the lattice-shaped lines crossing each other in the pattern have the same or similar line width and pitch defining an interval between the lines or have a line width or pitch having predetermined similarity.

5. The substrate for a touch screen sensor of claim 4, wherein the predetermined directions include first and second directions, wherein the line widths or the pitches of the lattice-shaped lines are determined according to a fill factor defining an area of the lines occupied in the substrate and satisfying the following equation:

the fill factor (%)=100−[[(horizontal pitch−line width)×(vertical pitch−line width)/(horizontal pitch×vertical pitch)]×100], and wherein the horizontal pitch corresponds to an interval between adjacent lines in the first direction, and the vertical pitch corresponds to an interval between adjacent lines in the second direction perpendicular to the first direction.

6. The substrate for a touch screen sensor of claim 5, wherein the fill factor of the lines is equal to or less than 10%.

7. The substrate for a touch screen sensor of claim 3, wherein each of the lattice-shaped lines is tilted according to a predetermined angle.

8. The substrate for a touch screen sensor of claim 7, wherein the pattern of the sensing units is a first pattern, and wherein the predetermined angle is an angle determined in order to prevent a moire phenomenon from being generated due to a mutual interference between the first pattern and a second pattern that is different from the first pattern.

9. The substrate for a touch screen sensor of claim 1, wherein each of the dummy units is insulated from the corresponding sensing units.

10. The substrate for a touch screen sensor of claim 1, further comprising:
a resin layer laminated on the base and including a plurality of grooves in the form of an intaglio on one side; and
an electrode layer formed by filling a conductive material in the grooves,
wherein the sensing units, the dummy units, and the sensing connecting units correspond to the electrode layer.

11. The substrate for a touch screen sensor of claim 10, wherein the filled conductive material includes copper (Cu), silver (Ag), aluminum (Al), nickel (Ni), chromium (Cr), and nickel-phosphorous (Ni—P).

12. The substrate for a touch screen sensor of claim 10, wherein the black layer is laminated above the electrode layer.

13. The substrate for a touch screen sensor of claim 1, wherein the electrodes of the corresponding one of the sensing units have a length that is alternately long and short, and the electrodes of the adjacent dummy unit have a length that is alternately long and short, and
wherein each of the long electrodes of the sensing unit has an endfacing to an end of a corresponding one of the short electrodes of the adjacent dummy unit, and extends in a direction parallel to that of the corresponding one of the short electrodes of the adjacent dummy unit.

14. The substrate of claim 1, wherein the plurality of sensing units include first, second, third, and fourth sensing units, the first sensing unit being disposed adjacent to the second sensing unit in a first direction, the first sensing unit being disposed adjacent to the third sensing unit in a second direction perpendicular to the first direction, the fourth sensing unit being disposed adjacent to the second sensing unit in the second direction and to the third sensing unit in the first direction, respectively, and
wherein the plurality of dummy units include a dummy unit that is disposed adjacent to the first, second, third, and fourth sensing units.

15. A touch screen sensor, comprising:
a first sensor including:
a plurality of first sensing units, each of the first sensing units including electrodes that are connected to each other in a first pattern on one side of a base;
first sensing connecting units, each of the first sensing connecting units including electrodes that are connected to each other in a pattern that is the same as the first pattern, each of the first sensing connecting units connecting adjacent first sensing units;
a plurality of first dummy units, each of the plurality of first dummy units being disposed adjacent to corresponding first sensing units and including electrodes that are connected to each other in a pattern that is the same as or similar to the first pattern of the first sensing units; and
a first black layer configured to reduce visibility of the first sensing units, the first dummy units, and the first sensing connecting units; and
a second sensor including:
a plurality of second sensing units, each of the second sensing units including electrodes that are connected to each other in a second pattern on the other side of the base or one side of another base;
second sensing connecting units, each of the second sensing connecting units including electrodes which are connected to each other in a pattern that is the same as the second pattern, each of the second sensing connecting units connecting adjacent second sensing units;
a plurality of second dummy units, each of the plurality of second dummy units being disposed adjacent to corresponding second sensing units and including electrodes that are connected to each other in a pattern that is the same as or similar to the second pattern of the second sensing units; and
a second black layer configured to reduce visibility of the second sensing units, the second dummy units, and the second sensing connecting units,
wherein the first pattern of a corresponding one of the first sensing units is disconnected on a first boundary between the corresponding one of the first sensing units and a first adjacent dummy unit such that the first pattern has an edge that corresponds to the first boundary and is opened, the second pattern of a corresponding one of the second sensing units is disconnected on a second boundary between the corresponding one of the second sensing units and a second adjacent dummy unit such that the second pattern has an edge that corresponds to the second boundary and is opened, or both of the first and second patterns are respectively disconnected on the first and second boundaries.

16. The touch screen sensor of claim 15, wherein the first or second pattern is alternately formed to be long and short at the edge that corresponds to the first or second boundary.

17. The touch screen sensor of claim 15, wherein the first or second pattern is a lattice-shaped pattern in which lines formed in predetermined directions cross each other.

18. The touch screen sensor of claim 17, wherein the lattice-shaped lines crossing each other in the first or second pattern have the same or similar line width and pitch defining an interval between the lines or have a line width or pitch having predetermined similarity.

19. The touch screen sensor of claim 18, wherein the predetermined directions include first and second directions, wherein the line widths or the pitches of the lattice-shaped lines are determined according to a fill factor defining an area of the lines occupied in the substrate and satisfying the following equation:

the fill factor (%)=100−[[(horizontal pitch−line width)×(vertical pitch−line width)/(horizontal pitch×vertical pitch)]×100], and wherein the horizontal pitch corresponds to an interval between adjacent lines in the first direction, and the vertical pitch corresponds to an interval between adjacent lines in the second direction perpendicular to the first direction.

20. The touch screen sensor of claim 19, wherein the fill factor of the lines is equal to or less than 10%.

21. The touch screen sensor of claim 17, wherein each of the lattice-shaped lines is tilted according to a predetermined angle.

22. The touch screen sensor of claim 21, wherein the predetermined angle is an angle determined in order to prevent a moire phenomenon from being generated due to a mutual interference between the first pattern and the second pattern.

23. The touch screen sensor of claim 15, wherein each of the first dummy units is insulated from the corresponding first sensing units.

24. The touch screen sensor of claim 15, wherein the first sensor, the second sensor, or both, includes:
   a resin layer laminated on the base and including a plurality of grooves in the form of an intaglio on one side; and
   an electrode layer formed by filling a conductive material in the grooves, and
   wherein the sensing units, the dummy units, and the sensing connecting units correspond to the electrode layer.

25. The touch screen sensor of claim 24, wherein the filled conductive material includes copper (Cu), silver (Ag), aluminum (Al), nickel (Ni), chromium (Cr), and nickel-phosphorous (Ni—P).

26. The touch screen sensor of claim 24, wherein one or both of the first black layer and the second black layer is laminated above the electrode layer.

27. The touch screen sensor of claim 15, wherein the electrodes of the corresponding one of the first sensing units have a length that is alternately long and short, and the electrodes of the first adjacent dummy unit have a length that is alternately long and short, and
   wherein each of the long electrodes of the sensing unit has an endfacing to an end of a corresponding one of the short electrodes of the adjacent dummy unit, and extends in a direction parallel to that of the corresponding one of the short electrodes of the adjacent dummy unit.

28. The touch screen sensor of claim 15, wherein the plurality of first sensing units include first, second, third, and fourth sensing units, the first sensing unit being disposed adjacent to the second sensing unit in a first direction, the first sensing unit being disposed adjacent to the third sensing unit in a second direction perpendicular to the first direction, the fourth sensing unit being disposed adjacent to the second sensing unit in the second direction and to the third sensing unit in the first direction, respectively, and
   wherein the plurality of first dummy units include a dummy unit that is adjacent to the first, second, third, and fourth sensing units.

* * * * *